United States Patent [19]
Pullen

[11] B 3,923,711

[45] Dec. 2, 1975

[54] WAX COATING COMPOSITIONS

[75] Inventor: Edward A. Pullen, Fullerton, Calif.

[73] Assignee: Union Oil Company of California, Los Angeles, Calif.

[22] Filed: Apr. 5, 1972

[21] Appl. No.: 241,433

[44] Published under the Trial Voluntary Protest Program on January 28, 1975 as document no. B 241,433.

Related U.S. Application Data

[63] Continuation-in-part of Ser. No. 82,088, Oct. 19, 1970, abandoned.

[52] U.S. Cl. ............... 260/28.5 AV; 260/86.7
[51] Int. Cl.² ..................................... C08L 91/08
[58] Field of Search ............... 260/28.5 AV, 86.7

[56] References Cited
UNITED STATES PATENTS 3,644,254  2/1972  Dew ........................ 260/28.5 AV

OTHER PUBLICATIONS

Technical Association of Pulp and Paper Industry, Vol. 45, No. 5, May 1962, Blends of Ethylene Vinyl Acetate Copolymers and Wax as Flexible Paper Coatings, Lamar et al.

*Primary Examiner*—Joseph L. Schofer
*Assistant Examiner*—Paul R. Michl
*Attorney, Agent, or Firm*—Lannas S. Henderson; Richard C. Hartman; Dean Sandford

[57] ABSTRACT

Wax coating compositions of improved water resistance are prepared by subjecting a molten blend of petroleum wax and an ethylene-vinyl acetate copolymer to controlled oxidation, either in the absence of any oxidation inhibitor, or in the presence of only limited amounts thereof, so as to effect a partial oxidation of the copolymer without significant oxidation of the wax component. Following the oxidation, inhibitor is added to provide commercially effective concentrations thereof.

8 Claims, No Drawings

WAX COATING COMPOSITIONS

RELATED APPLICATIONS

This application is a continuation-in-part of Ser. No. 82,088, filed Oct. 19, 1970, now abandoned.

BACKGROUND OF THE INVENTION

This invention relates to wax compositions and more particularly to blends of waxes and polymers for use in coating paper, and the paper products coated therewith.

It is well known to coat paper and paperboard with wax. Such coatings are especially useful in rendering paper or paperboard resistant to moisture penetration. Numerous waxes have been used in coatings, including animal and vegetable waxes such as beeswax, wool wax, cotton wax and the like. Even more common are the mineral waxes epsecially petroleum waxes such as paraffin wax, microcrystalline waxes and the like. Blends of waxes have also been used; however, in all such wax coatings certain deficiencies have been encountered. Thus, for example, pure wax coatings often are lacking in hardness, scuff resistance, tensile strength, resistance to cracking, and other characteristics. To overcome these difficulties it has become common practice to use blends of certain polymers in wax. Examples of such polymers include those prepared from ethylene, propylene and other mono-olefins. Also, polymers prepared from aromatic and cyclic materials such as styrenes, terpenes, and the like have been used to improve certain characteristics of wax coatings. Various copolymers such as ethylene-propylene copolymers, ethylene-vinyl acetate copolymers and conventional rubber type polymers such as styrene-butadiene polymers have been used.

Although the use of polymers as additives has greatly improved certain characteristics in wax coatings, many such coatings are still insufficiently resistant to moisture penetration. It is extremely important in the manufacture of paperboard containers for dairy products such as milk, butter and the like that the coatings have a low moisture vapor permeability. This is essential not only to prevent leakage from the container but also to exclude contaminants from entering the container and polluting the contents.

Accordingly, it is an object of this invention to prepare wax-polymer blends which when applied to paper, paperboard and the like result in coating paper products having reduced moisture vapor permeabilities.

SUMMARY OF THE INVENTION

This invention contemplates preparing partially oxidized blends of wax and polymers and coating paper or paperboard with such blends. The blends of this invention are prepared by dissolving and mixing an ethylene-vinyl acetate copolymer, together if desired with any of the other polymers or copolymers previously mentioned, in molten wax and contacting the molten mixture with an oxidizing agent under conditions which substantially oxidize the polymer without substantially oxidizing the wax. In some cases it may be desirable to control the oxidation by including in the mixture an anti-oxidant in amounts sufficient to essentially prevent oxidation of the wax but insufficient to prevent partial oxidation of the polymer. The molten mix is maintained at high temperatures for a time sufficient to partially oxidize the polymer, thereby reducing the moisture vapor permeability of paper products coated with the mix, but insufficient to oxidize the wax to any detrimental extent.

The oxidation is preferably achieved by agitating and mixing the melt, i.e., the molten wax, polymer, and anti-oxidant if desired, in contact with air. More rapid and efficient contacting can be achieved by bubbling a gaseous oxidizing agent such as oxygen or air through the melt. The reaction temperature depends to some extent upon whether an anti-oxidant is used, and the type and quantity thereof, but generally the temperature is between the melting point of the wax blend and about 450°F. and preferably between about 200° and 350°F. If the temperature is too low, little or no reaction occurs and the moisture vapor permeability will not be lessened to any appreciable extent. On the other hand, if the temperature is too high excessive oxidation occurs and the wax itself may be thermally degraded or oxidized.

The wax blend is contacted with the oxidizing agent for a sufficient time, generally about 10 minutes to about 6 hours and preferably from about 30 minutes to 3 hours. If the blend is contacted for too long a time there is a tendency for the wax to break down due to oxidation or thermal degradation. Conversely, if the contacting is maintained for too short a time no significant effect on the moisture vapor permeability can be discerned.

With suitable control of time and temperature, it is generally unnecessary to employ an anti-oxidant, but to facilitate control of the oxidation, expecially in the case of the more readily oxidizable waxes, it may be desirable to add minimal proportions thereof. Any food-compatible oxidation inhibitor may be used. Many such compounds are well known in the art including primarily the hindered phenols wherein both positions ortho to the phenolic hydroxyl group are occupied by secondary or tertiary alkyl groups. The preferred inhibitor is 2-6-ditertiary butylparacresol. The amount of inhibitor used depends on the particular compound chosen, and the time and temperature of the oxidation treatment. Generally, however, about 2–200, and preferably about 5–50 parts per million based on the weight of the wax-polymer mixture is used. If too large an amount is used neither the polymer nor the wax is significantly oxidized with the result that little or no reduction in moisture vapor permeability is achieved.

Immediately following the oxidation step, sufficient antioxidant is added to the wax blend to give adequate protection against the oxidizing conditions to be encountered in subsequent commercial use. Depending upon the intended use, and the specific wax composition, effective total anti-oxidant concentrations may range between about 100 and 800 ppm, normally about 200–600 ppm.

The partially oxidized wax blends of this invention are applied to paper or paperboard in any conventional manner. For example the blends can be applied using conventional curtain-coating apparatus as well as rolling, dipping or other coating and impregnating techniques. Under comparable conditions the paper products which are coated with the wax blends of this invention have greatly improved resistance to moisture penetration compared to paper products coated with similar wax blends which have not been partially oxidized.

DETAILED DESCRIPTION AND EXAMPLES OF THE INVENTION

The invention may be better understood by reference to the following illustrative examples.

EXAMPLE 1

This example illustrates the effect on water vapor permeability of the oxidation treatment, and also that high concentrations of anti-oxidant should not be added to the wax blends prior to oxidation.

A blend of wax and polymer was prepared by melting a commercial paraffin wax having a melting point of about 143°F (Aristowax 143/150 marketed by Union Oil Company of California) at a temperature of about 290°F. To the molten wax was then added a copolymer in pellet form of ethylene-vinyl acetate. The copolymer had an ethylene to vinyl acetate ratio of about 72 to 28 and melt index of about 125 to 175 (Elvax 220 marketed by E. I. DuPont de Nemours). Also added to the blend was a second copolymer of ethylene and vinyl acetate having an ethylene to vinyl acetate ratio of about 72 to 28 and having a melt index of about 12 to 18 with a molecular weight of about 40,000 (Elvax 250 marketed by E. I. DuPont de Nemours). To the molten blend there was also added a small amount of Armid "O," an oleylamide slip agent. No anti-oxidant was added to the blend separately although in the paraffin wax there was contained about 20 ppm of food grade butylated hydroxy toluene (2-6-diteritary butylparacresol) as an anti-oxidant. This corresponded to about 14 ppm on the total blend.

For comparative purposes, an identical blend was prepared except that 200 ppm of butylated hydroxy toluene was incorporated in the blend.

The two samples were oxidized at about 290°F. for about 90 minutes with agitation and mixing in a conventional laboratory blender with a recirculating pump which continuously aerated a circulating slip stream of the blend. The mixing vessel was open to the atmosphere. The blends were then cooled and solidified, and later remelted and coated onto 0.029 inch food-board type paper at 300°F. The coated paper was then tested for moisture vapor permeability using test No. T464 (Technical Association of Pulp and Paper Industry, T.A.P.P.I.). The results of the test are given in terms of grams of moisture penetrating 100 square inches of surface in 24 hours at 100°F. and 90 percent relative humidity.

As illustrated below in Table I, the results of the tests clearly show the superiority of the oxidized wax blend containing only 14 ppm anti-oxidant over the essentially unoxidized blend containing 200 ppm anti-oxidant.

TABLE I

| Composition | Concentration, Wt-% of Total Blend | |
|---|---|---|
| | Example 1 | Comparative Blend |
| Wax | 69.5 | 69.5 |
| Copolymer A (Elvax 220) | 15.0 | 15.0 |
| Copolymer B (Elvax 250) | 15.0 | 15.0 |
| Armid "O" | 0.4 | 0.5 |
| Antioxidant, ppm | 14 | 200 |
| MVP[1] g/100 in 2/24 Hr. | | |
| Uncreased | 0.60 | 1.22 |
| Creased | 0.77 | 1.29 |

[1] MVP = Moisture vapor permeability. Uncreased MVP is determined according to T.A.P.P.I. test T464 and Creased according to test T465.

As the data illustrate, the wax prepared in accordance with this invention resulted in coated samples having moisture vapor permeabilities, uncreased and creased, respectively, of only 50 and 60 percent of those obtained on the relatively unoxidized samples containing larger quantities of anti-oxidant. Substantially the same differential results are obtained when the oxidation of Example 1 is carried out in the absence of any anti-oxidant.

For commercial use, it is preferred to add about 400 ppm of the DBPC anti-oxidant to the blend of Example 1 immediately following the oxidation treatment.

EXAMPLE 2

This example further illustrates the detrimental effect on moisture vapor permeability of adding large amounts of anti-oxidant to the blends prior to the oxidation step. The blends in this example were prepared in essentially the same manner as described in Example 1 except that in addition to the two types of ethylene-vinyl acetate copolymers used there was also added 5 weight-percent of polyethylene in pellet form having a molecular weight of about 2,000 (marketed as AC-6 by Allied Chemical Co.). In addition to the sample prepared with minimum anti-oxidant in accordance with the present invention, two additional comparative tests were made, which are indicated below in Table II, as comparative Tests A and B, using approximately 200 and 600 ppm of anti-oxidant, respectively.

TABLE II

| Composition | Concentration, Wt-% of Total Blend | | |
|---|---|---|---|
| | Example 2 | Comparative Tests | |
| | | A | B |
| Wax | 64.5 | 64.5 | 64.2 |
| Copolymer A (Elvax 220) | 15.0 | 15.0 | 15.0 |
| Copolymer B (Elvax 250) | 15.0 | 15.0 | 15.0 |
| Polyethylene (AC-6) | 5.0 | 5.0 | 5.0 |
| Armid "O" | 0.5 | 0.5 | 0.74 |
| Antioxidant (DBPC), ppm | 13 | 200 | 600 |
| MVP, g/100 in²/24 Hr. | | | |
| Uncreased | 0.70 | 1.60 | 2.26 |
| Creased | 1.10 | 1.37 | 2.36 |

As the data indicate, sharply increased values of moisture vapor permeability occur with increasing amounts of antioxidant added to the blends prior to the oxidation step; amounts in the range of 200–600 ppm should be added immediately after the oxidation.

EXAMPLE 3

This example illustrates the effect upon viscosity which is achieved by oxidizing the blend for a sufficient time to partially oxidize the polymer without effecting any significant oxidation of the wax. In this example two blends of wax containing two types of ethylene-vinyl acetate copolymers and polyethylene were prepared. In one blend the concentration of antioxidant was insufficient to prevent oxidation of the copolymers; in the other blend a higher concentration was employed. The blends were mixed and air oxidized for about 300 minutes at melt temperatures of about 300°F as previously described.

After the blends had been oxidized they were cooled to ambient temperatures and samples were taken for determination of kinematic viscosity. The results of the viscosity tests are given below in Table III.

TABLE III

| Composition | Concentration, Wt-% of Total Blend | |
|---|---|---|
| | Example 3 | Comparative Test |
| Wax | 64.5 | 64.44 |
| Copolymer A (Elvax 220) | 15.0 | 15.0 |
| Copolymer B (Elvax 250) | 15.0 | 15.0 |
| Polethylene | 5.0 | 5.0 |
| Armid "O" | 0.5 | 0.5 |
| Antioxidant, ppm | 13 | 600 |
| Kinematic Viscosity, Centistokes | | |
| 275°F. | 735 | 1021 |
| 310°F. | 535 | 662 |
| 350°F. | 354 | 415 |

As the table shows, the viscosity of the blend prepared in accordance with this invention was only about 70 to 85 percent of the viscosity of the blend prepared using a larger amount of antioxidant. In general it is considered desirable to oxidize the wax blends in accordance with the present invention until the kinematic viscosity at 275°F. is at least about 10 percent lower and preferably from about 15 to 40 percent lower than the kinematic viscosity prior to oxidation.

The precise mechanism for oxidizing the blends in accordance with this invention is not fully understood; however, it is noted that as the oxidation occurs, the blends tend to darken slightly in color simultaneously with the reduction in viscosity. It appears that the polymers or copolymers are preferentially oxidized leaving the wax essentially unoxidized. This result is believed to be due to the difference in reactivity or reaction mechanism for oxidizing waxes compared to the mechanism for oxidizing polymers. In any event, it is clear that when no inhibitor at all is used, or only minimal amounts thereof, the copolymers are selectively oxidized resulting in a coating composition of improved water resistance. On the other hand, when high inhibitor concentrations are used, very little oxidation occurs with the result that there is little or no improvement in the moisture vapor permeability.

I claim:

1. A method for preparing a wax coating blend having reduced moisture vapor permeability which comprises: dissolving and blending an ethylene-vinyl acetate copolymer and about 0–200 ppm of an antioxidant in molten petroleum wax, and agitating and mixing the molten wax-polymer blend with an oxygen-containing gas for a time insufficient to significantly degrade said wax but sufficient to partially oxidize said polymer, whereby the moisture vapor permeability of the blend is substantially reduced and thereafter adding to the oxidized blend an increment of anti-oxidant.

2. The method of claim 1 wherein said oxidizing agent comprises air.

3. The method of claim 2 wherein said agitating and mixing is carried out at temperatures ranging from the melting point of the blend to about 450°F. for a time ranging from about 10 minutes to about 6 hours.

4. The method of claim 2 wherein the antioxidant concentration during said oxidation is between about 0–50 ppm, and wherein the total concentration of antioxidant after addition of said increment thereof is between about 100 and 800 ppm.

5. The method of claim 2 wherein said wax comprises principally paraffin wax and said antioxidant is a hindered phenol.

6. The method of claim 3 wherein said temperature ranges from about 200° to abot 350°F. for a time ranging from about 30 minutes to about 3 hours and wherein the anti-oxidant concentration during said oxidation is between about 5–50 ppm, and the total concentration of antioxidant after addition of said increment thereof is between about 200 and 600 ppm.

7. The method of claim 6 wherein said antioxidant is 2-6-ditertiary butyl-paracresol.

8. A coating composition comprising a blend of a paraffin wax, an ethylene-vinyl acetate copolymer, and about 200 – 600 ppm of an anti-oxidant, said vinyl acetate copolymer being in a partially oxidized state to provide a coating composition of reduced moisture vapor permeability, as compared to the same composition containing unoxidized ethylene-vinyl acetate copolymer.

* * * * *